United States Patent
Ochiai et al.

(10) Patent No.: US 7,525,278 B2
(45) Date of Patent: Apr. 28, 2009

(54) VOLTAGE CONVERSION APPARATUS, POWER OUTPUT APPARATUS, AND CONTROL METHOD OF VOLTAGE CONVERTER

(75) Inventors: Kiyoe Ochiai, Nagoya (JP); Hiroyuki Oyanagi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 305 days.

(21) Appl. No.: 11/647,237

(22) Filed: Dec. 29, 2006

(65) Prior Publication Data
US 2007/0200521 A1 Aug. 30, 2007

(30) Foreign Application Priority Data
Feb. 10, 2006 (JP) .............................. 2006-034195

(51) Int. Cl.
*H02P 1/46* (2006.01)

(52) U.S. Cl. ....................... 318/779; 318/105; 318/376; 307/149; 363/37

(58) Field of Classification Search ......... 318/105–109, 318/112, 376, 430, 434, 439, 722, 779, 801; 307/66, 149; 363/37, 39, 41, 54, 65, 98, 363/132; 361/23, 24, 93.1
See application file for complete search history.

(56) References Cited

U.S. PATENT DOCUMENTS

| 5,698,955 | A  | * | 12/1997 | Nii ............................. 318/139 |
| 6,834,221 | B2 | * | 12/2004 | Jager et al. .................... 701/34 |
| 7,120,037 | B2 | * | 10/2006 | Komatsu et al. .............. 363/37 |
| 7,164,253 | B2 | * | 1/2007  | Sato et al. .................... 318/801 |
| 7,425,782 | B2 | * | 9/2008  | Nakamura .................. 307/149 |

FOREIGN PATENT DOCUMENTS

JP         A 2004-229399        8/2004

\* cited by examiner

*Primary Examiner*—Rajnikant B Patel
(74) *Attorney, Agent, or Firm*—Oliff & Berridge, PLC

(57) ABSTRACT

An upper limit value setting unit of a control device conducts integration on the change in battery power, and determines whether the integrated value is lower than a preset first threshold value (negative value). When determination is made that the integrated value is lower than the first threshold value, and the battery power difference is lower than the second threshold value (negative value), the upper limit value setting unit sets Vup2 that is lower than the general Vup1 as the upper limit value of the inverter input voltage command.

14 Claims, 6 Drawing Sheets

VOLTAGE CONVERSION APPARATUS, POWER OUTPUT APPARATUS, AND CONTROL METHOD OF VOLTAGE CONVERTER

This nonprovisional application is based on Japanese Patent Application No. 2006-034195 filed with the Japan Patent Office on Feb. 10, 2006, the entire contents of which are hereby incorporated by reference.

BACKGROUND OF THE INVENTION

1. Field of the Invention

The present invention relates to a voltage conversion apparatus, a power output apparatus, and a control method of a voltage converter. Particularly, the present invention relates to control of a voltage converter that converts voltage between a driving device that drives an electric motor in a power running mode or regeneration mode and a DC (Direct Current) power source.

2. Description of the Background Art

Recently, attention is focused on hybrid vehicles and electric vehicles as vehicles taking into account environmental issues.

A hybrid vehicle includes, in addition to a conventional engine, a DC power source, an inverter, and a motor driven by the inverter as the power source. In addition to achieving the power by driving the engine, the voltage from the DC power source is converted into AC (Alternating Current) voltage by the inverter, and the converted AC voltage is used to drive the motor to achieve power. An electric vehicle includes a DC power source, an inverter, and a motor driven by the inverter as the power source.

Some of the hybrid vehicles and electric vehicles employ the approach of boosting the voltage from the DC power source by a boost converter and providing the same to the inverter. Japanese Patent Laying-Open No. 2004-229399 discloses a voltage conversion apparatus including such a boost converter. This voltage conversion apparatus supplies power to the inverter that drives the AC motor such that excessive current does not flow to the circuit element that conducts the boosting operation even if the voltage command value of the boost converter increases drastically.

However, the publication of Japanese Patent Laying-Open No. 2004-229399 is silent about a problem of the inverter voltage (the voltage between the boost converter and inverter) attaining an overvoltage level when the power balance of the AC motor is continuously at the regeneration side.

Even if the power balance of the AC motor temporarily attains the regeneration side, the inverter voltage will not become excessive since the regeneration power is absorbed by the capacitor arranged between the boost converter and the inverter. However, when the power balance of the AC motor is continuously at the regeneration side when the inverter voltage is controlled at the vicinity of the upper limit value by the boost converter, control of the boost converter cannot follow the rise of the inverter voltage, leading to the possibility of excessive inverter voltage.

SUMMARY OF THE INVENTION

In view of the foregoing, an object of the present invention is to provide a voltage conversion apparatus, a power output apparatus, and a control method of a voltage converter, directed to preventing the driving device that drives an electric motor from receiving excessive voltage when the power balance of the electric motor is continuously at the regeneration side.

According to an aspect of the present invention, a voltage conversion apparatus includes a voltage converter, a control device, and a sensor device. The voltage converter is provided between a DC power source and a driving device that drives at least one electric motor in one of a power running mode and regeneration mode. The control device is configured to boost the voltage from the DC power source by controlling the voltage converter within a range that does not exceed an upper limit value. The sensor device senses the power input to and output from the DC power source. The control device reduces the upper limit value in the event of the integrated value of change in power for a first predetermined period becoming lower than a first threshold value that is negative in the case where the sign of the power, when output from the DC power source, is positive.

Preferably, the control device reduces the upper limit value in the event of the integrated value of change in power from a reference value in the first predetermined period becomes lower than the first threshold value. The reference value corresponds to the power at the starting point in time of the first predetermined period.

Preferably, the control device ceases reducing the upper limit value when the change in power from a starting point in time of a second predetermined period that is shorter than the first predetermined period is at least a second threshold value that is negative.

Preferably, the first predetermined period is a defined period allowing determination of whether the power balance of at least one electric motor is continuously at the regeneration side or not.

According to another aspect of the present invention, a power output apparatus includes at least one electric motor, a driving device, a DC power source, a voltage converter, a control device, and a sensor device. The driving device drives at least one electric motor in one of a power running mode and a regeneration mode. The DC power source is rechargeable. The voltage converter converts voltage between the DC power source and the driving device. The control device is configured to boost the voltage from the DC power source within a range that does not exceed the upper limit value by controlling the voltage converter. The sensor device senses the power input to and output from the DC power source. The control device reduces the upper limit value in the event of the integrated value of change in power for a first predetermined period becoming lower than a first threshold value that is negative in the case where the sign of the power, when output from the DC power source, is positive.

Preferably, the at least one electric motor includes first and second AC motors. The driving device includes first and second inverters. The first inverter drives the first AC motor in one of a power running mode and regeneration mode. The second inverter drives the second AC motor in one of a power running mode and regeneration mode. The power output apparatus includes an internal combustion engine and a driving wheel. The internal combustion engine is mechanically coupled to the rotational shaft of the first AC motor. The driving wheel is mechanically coupled to the rotational shaft of the second AC motor.

According to a further aspect of the present invention, a control method of a voltage converter provided between a DC power source and a driving device that drives at least one electric motor in one of a power running mode and a regeneration mode and includes first to fourth steps. In the first step, the power input to and output from the DC power source is sensed. In the second step, the integrated value of change in power for the first predetermined period is calculated. In the third step, the upper limit value of voltage output from the voltage converter to the driving device is reduced in the event of the calculated integrated value becoming lower than a first threshold value that is negative in the case where the sign of the power, when output from the DC power source, is positive. In the fourth step, the voltage from the DC power source is boosted within a range that does not exceed the upper limit value by controlling the voltage converter.

Preferably in the second step, an integrated value of change in power from a reference value in the first predetermined period is calculated. The reference value corresponds to the power at the starting point in time of the first predetermined period.

Preferably, the control method of a voltage converter further includes a fifth step. In the fifth step, reduction of the upper limit value is ceased when change in power from a starting point in time of a second predetermined period that is shorter than the first predetermined period is at least a second threshold value that is negative.

According to the present invention, the voltage converter is controlled such that the voltage from the DC power source is boosted within a range that does not exceed the upper limit value. In the event of the integrated value of the change in power for the first predetermined period becoming lower than the first threshold value that is negative in the case where the sign of power, when output from the DC power source, is positive, the upper limit value is reduced. Conventionally, there are cases where determination of whether the power balance of at least one electric motor is continuously at the regeneration side or not cannot be made properly by just the change in power from a certain point in time. In the present invention, determination of whether the power balance of at least one electric motor is continuously at the regeneration side or not can be made properly since an integrated value of change in power for a first predetermined period is used. Further, the boosting of voltage by the voltage converter is suppressed in the event of the calculated integrated value becoming lower than the first threshold value (negative value) since the upper limit value is reduced.

By virtue of the present invention, excessive voltage on the driving device can be prevented in the case where the power balance of at least one electric motor is continuously at the regeneration side.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
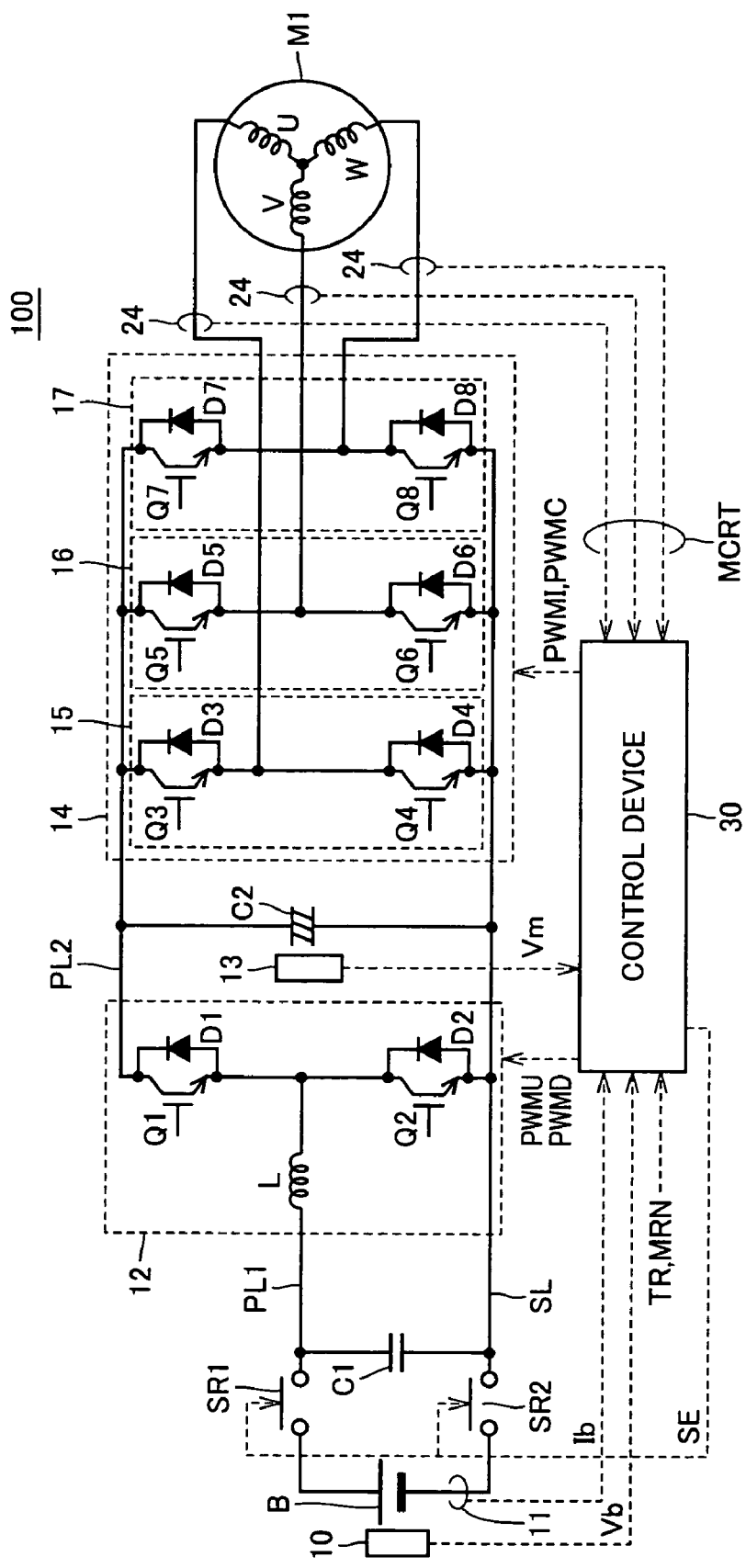
FIG. 1 is a circuit diagram of a motor driving device including a motor conversion apparatus according to an embodiment of the present invention.

Embodiments of the present invention will be described hereinafter with reference to the drawings. In the drawings, the same or corresponding elements have the same reference characters allotted, and description thereof will not be repeated.

FIG. 1 is a circuit diagram of a motor driving device including a voltage conversion apparatus according to an embodiment of the present invention. Referring to FIG. 1, a motor driving device 100 includes a DC power source B, voltage sensors 10 and 13, system relays SR1 and SR2, capacitors C1 and C2, a boost converter 12, an inverter 14, current sensors 11 and 24, and a control device 30.

Motor driving device 100 is incorporated in a motorized vehicle such as a hybrid vehicle, an electric vehicle, and the like. An AC motor M1 is mechanically coupled to a driving wheel, and generates torque to drive the vehicle. Alternatively, AC motor M1 may be mechanically coupled to an engine, and incorporated into a hybrid vehicle as a power generator generating power using the driving power of the engine and as an electric motor for engine startup.

Boost converter 12 includes a reactor L, NPN transistors Q1 and Q2, and diodes D1 and D2. Reactor L has one end connected to the positive electrode of DC power source B via a power supply line PL1 and a system relay SR1, and the other end connected to the intermediate point between NPN transistor Q1 and NPN transistor Q2, i.e. the connection node of the emitter of NPN transistor Q1 and the collector of NPN transistor Q2. NPN transistors Q1 and Q2 are connected in series between a power supply line PL2 and a ground line SL. The collector of NPN transistor Q1 is connected to power supply line PL2, and the emitter of NPN transistor Q2 is connected to ground line SL. Diodes D1 and D2 conducting current from the emitter side to the collector side are connected between the collector and emitter of NPN transistors Q1 and Q2, respectively.

Inverter 14 includes a U-phase arm 15, a V-phase arm 16, and a W-phase arm 17. U-phase arm 15, V-phase arm 16, and W-phase arm 17 are connected in parallel between power supply line PL2 and ground line SL.

U-phase arm 15 includes NPN transistors Q3 and Q4 connected in series. V-phase arm 16 includes NPN transistors Q5 and Q6 connected in series. W-phase arm 17 includes NPN transistors Q7 and Q8 connected in series. Diodes D3-D8 conducting current from the emitter side to the collector side are connected between the collector and emitter of NPN transistors Q3-Q8, respectively.

The intermediate point of each phase arm is connected to each phase end of each phase coil in AC motor M1. In other words, AC motor M1 is a 3-phase permanent magnet motor, having one end of the three coils of the U, V, and W phases connected common to the neutral point. The U-phase coil has the other end connected to the intermediate point of NPN transistors Q3 and Q4. The V-phase coil has the other end connected to the intermediate point of NPN transistors Q5 and Q6. The W-phase coil has the other end connected to the intermediate point of NPN transistors Q7 and Q8.

Other power switching elements such as an IGBT (Insulated Gate Bipolar Transistor) or a power MOSFET can be employed instead of NPN transistors Q1-Q8, and the like.

DC power source B includes a secondary battery such as a nickel-hydrogen or lithium-ion battery. Voltage sensor 10 detects voltage Vb of DC power source B and provides the detected voltage Vb to control device 30. Current sensor 11 detects current Ib input to or output from DC power source B, and provides the detected current Ib to control device 30. System relays SR1 and SR2 are turned on/off by a signal SE from control device 30.

Capacitor C1 smoothes the voltage supplied from DC power source B, and provides the smoothed voltage to boost converter 12.

Boost converter 12 boosts the voltage supplied from capacitor C1 and supplies the boosted voltage to capacitor C2. Specifically, boost converter 12 responds to a signal PWMU from control device 30 to boost and supply to capacitor C2 DC voltage according to the ON-period of NPN transistor Q2. In this case, NPN transistor Q1 is turned off by signal PWMU. Boost converter 12 also responds to a signal PWMD from control device 30 to lower DC voltage supplied from inverter 14 via capacitor C2 to charge DC power source B.

Capacitor C2 smoothes the voltage from boost converter 12, and provides the smoothed voltage to inverter 14. Voltage sensor 13 detects the voltage across capacitor C2, i.e. output voltage Vm of boost converter 12 (corresponding to the input voltage of inverter 14; the same applies hereinafter), and provides the detected voltage Vm to control device 30.

Inverter 14 converts the DC voltage supplied from capacitor C2 into AC voltage based on a signal PWMI from control device 30 to drive AC motor M1. Accordingly, AC motor M1 is driven to generate the torque designated by torque command value TR. When the hybrid vehicle or electric vehicle in which motor driving device 100 is incorporated is in a regenerative braking mode, inverter 14 converts the AC voltage generated by AC motor M1 into DC voltage based on signal PWMC from control device 30, and supplies the converted DC voltage to boost converter 12 via capacitor C2.

As used herein, "regenerative braking" includes braking in association with regenerative power generation when the driver of the hybrid vehicle or electric vehicle operates the foot brake as well as reducing the vehicle speed (or ceasing acceleration) while effecting regenerative power generation by setting off the accelerator pedal during running without operating the foot brake.

Current sensor 24 detects motor current MCRT flowing to AC motor M1, and provides the detected motor current MCRT to control device 30.

Control device 30 generates a signal PWMU to drive boost converter 12 and a signal PWMI to drive inverter 14, based on a torque command value TR and a motor rotational speed MRN applied from an externally provided ECU (Electronic Control Unit), voltage Vb from voltage sensor 10, voltage Vm from voltage sensor 13, and motor current MCRT from current sensor 24, and provides the generated signals PWMU and PWMI to boost converter 12 and inverter 14, respectively.

Signal PWMU serves to drive boost converter 12 when boost converter 12 converts the voltage from capacitor CI into voltage Vm. Control device 30 feedback-controls voltage Vm when boost converter 12 converts the voltage from capacitor C1 into voltage Vm, and generates signal PWMU such that voltage Vm attains the level of voltage command Vdc_com.

Upon receiving a signal indicating that the hybrid vehicle or electric vehicle has entered a regenerative braking mode from the external ECU, control device 30 generates signal PWMC to convert the AC voltage generated at AC motor M1 into DC voltage, and provides the generated signal PWMC to inverter 14. In this case, NPN transistors Q3-Q8 of inverter 14 are under switching control by signal PWMC. Accordingly, inverter 14 converts the AC voltage generated at AC motor M1 into DC voltage, which is supplied to boost converter 12.

Upon receiving a signal indicating that the hybrid vehicle or electric vehicle has entered a regenerative braking mode from the external ECU, control device 30 generates signal PWMD to lower the voltage supplied from inverter 14, and provides the generated signal PWMD to boost converter 12. Accordingly, the AC voltage generated by AC motor M1 is converted into DC voltage by inverter 14, lowered by voltage converter 12, and supplied to DC power source B.

Control device 30 also calculates battery power Pb. Battery power Pb indicates the power input to or output from DC power source B. Battery power Pb of a positive value indicates that power is output from the DC power source (discharge). Battery power Pb of a negative value indicates that power is input to the DC power source (charge). Battery power Pb can be calculated based on current Ib from current sensor 11 and voltage Vb from voltage sensor 10. Battery power Pb can also be obtained using the power of AC motor M1 that can be calculated based on motor current MCRT from current sensor 24 and the motor voltage of AC motor M1 detected by a voltage sensor not shown.

Control device 30 determines whether the power balance of AC motor M1 is continuously at the regeneration side based on calculated battery power Pb by a method that will be described afterwards. When determination is made that the power balance is continuously at the regeneration side, control device 30 sets the upper limit value of voltage command Vdc_com qualified as the target voltage of output voltage Vm of boost converter 12 to a value lower than that of the normal case.

Further, control device 30 generates a signal SE to turn on/off system relays SR1 and SR2, and provides the generated signal to system relays SR1 and SR2.

Figure 2:
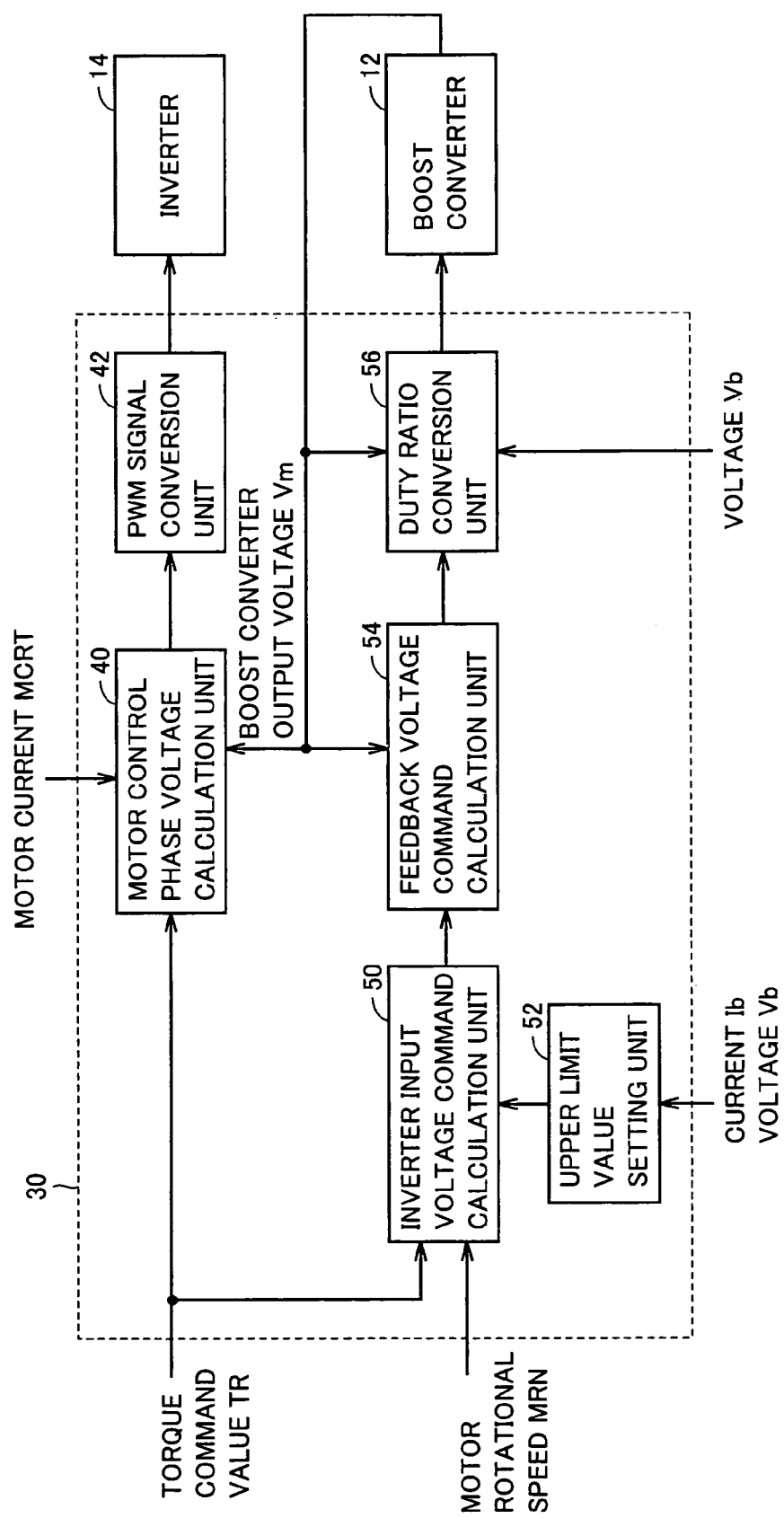
FIG. 2 is a functional block diagram of the control device shown in FIG. 1.

Referring to the functional block diagram of FIG. 2 corresponding to control device 30 of FIG. 1, control device 30 includes a phase voltage calculation unit 40 for motor control, a PWM signal conversion unit 42, an inverter input voltage command calculation unit 50, an upper limit value setting unit 52, a feedback voltage command calculation unit 54, and a duty ratio conversion unit 56.

Motor control phase voltage calculation unit 40 receives output voltage Vm of boost converter 12, i.e. the input voltage of inverter 14 from voltage sensor 13, receives motor current MCRT flowing through each phase of AC motor M1 from current sensor 24, and receives torque command value TR from the external ECU. Motor control phase voltage calculation unit 40 calculates the voltage to be applied to the coil of each phase of AC motor M1 based on these signals, and supplies the calculated result to PWM signal conversion unit 42.

PWM signal conversion unit 42 generates signals PWMI and PWMC to turn on/off each of NPN transistors Q3-Q8 of inverter 14 based on the voltage command of each phase calculated by motor control phase voltage calculation unit 40, and provides generated signals PWMI and PWMC to each of NPN transistors Q3-Q8 of inverter 14.

Accordingly, each of NPN transistors Q3-Q8 is under switching control, and controls the current flow to each phase of AC motor M1 such that AC motor M1 outputs the designated torque. Thus, the motor drive current is controlled such that motor torque corresponding to torque command value TR is output.

Inverter input voltage command calculation unit 50 calculates the optimum value of the inverter input voltage (target value), i.e. voltage command Vdc_com, based on torque command value TR and motor rotational speed MRN. Inverter input voltage command calculation unit 50 compares the calculated voltage command Vdc_com with the upper limit value set by upper limit value setting unit 52, and restricts voltage command Vdc_com to the upper limit value when the calculated voltage command Vdc_com exceeds the upper limit value, and provides the restricted voltage command to feedback voltage command calculation unit 54.

Upper limit value setting unit 52 calculates battery power Pb, and determines whether the power balance of AC motor M1 is continuously at the regeneration side by a method that will be described afterwards. When determination is made that the power balance of AC motor M1 is not continuously at the regeneration side, upper limit value setting unit 52 outputs Vup1 as the upper limit value of voltage command Vdc_corn to inverter input voltage command calculation unit 50. When determination is made that the power balance of AC motor M1 is continuously at the regeneration side, upper limit value setting unit 52 provides Vup2 that is lower than Vup1 as the upper limit value of voltage command Vdc_com to inverter input voltage command calculation unit 50.

Feedback voltage command calculation unit 54 calculates the feedback voltage command based on voltage Vm from voltage sensor 13 and voltage command Vdc_com from inverter input voltage command calculation unit 50, and provides the calculated feedback voltage command to duty ratio conversion unit 56.

Duty ratio conversion unit 56 calculates the duty ratio to control voltage Vm at the level of the feedback voltage command based on voltage Vb from voltage sensor 10 and the feedback voltage command from feedback voltage command calculation unit 54, and generates signals PWMU and PWMD to turn on/off NPN transistors Q1 and Q2 of boost converter 12 based on the calculated duty ratio. Duty ratio conversion unit 56 provides the generated signals PWMU and PWMD to NPN transistors Q1 and Q2 of boost converter 12.

Since the power accumulation at reactor L becomes larger by increasing the ON duty of NPN transistor Q2 at the ground line SL side of boost converter 12, a higher voltage output can be obtained. The voltage at power supply line PL2 is reduced by increasing the ON duty of NPN transistor Q1 at the power supply line PL2 side. By controlling the duty ratio of NPN transistors Q1 and Q2, the voltage between power supply lines PL1 and PL2 can be controlled to an arbitrary positive voltage.

Figure 3:
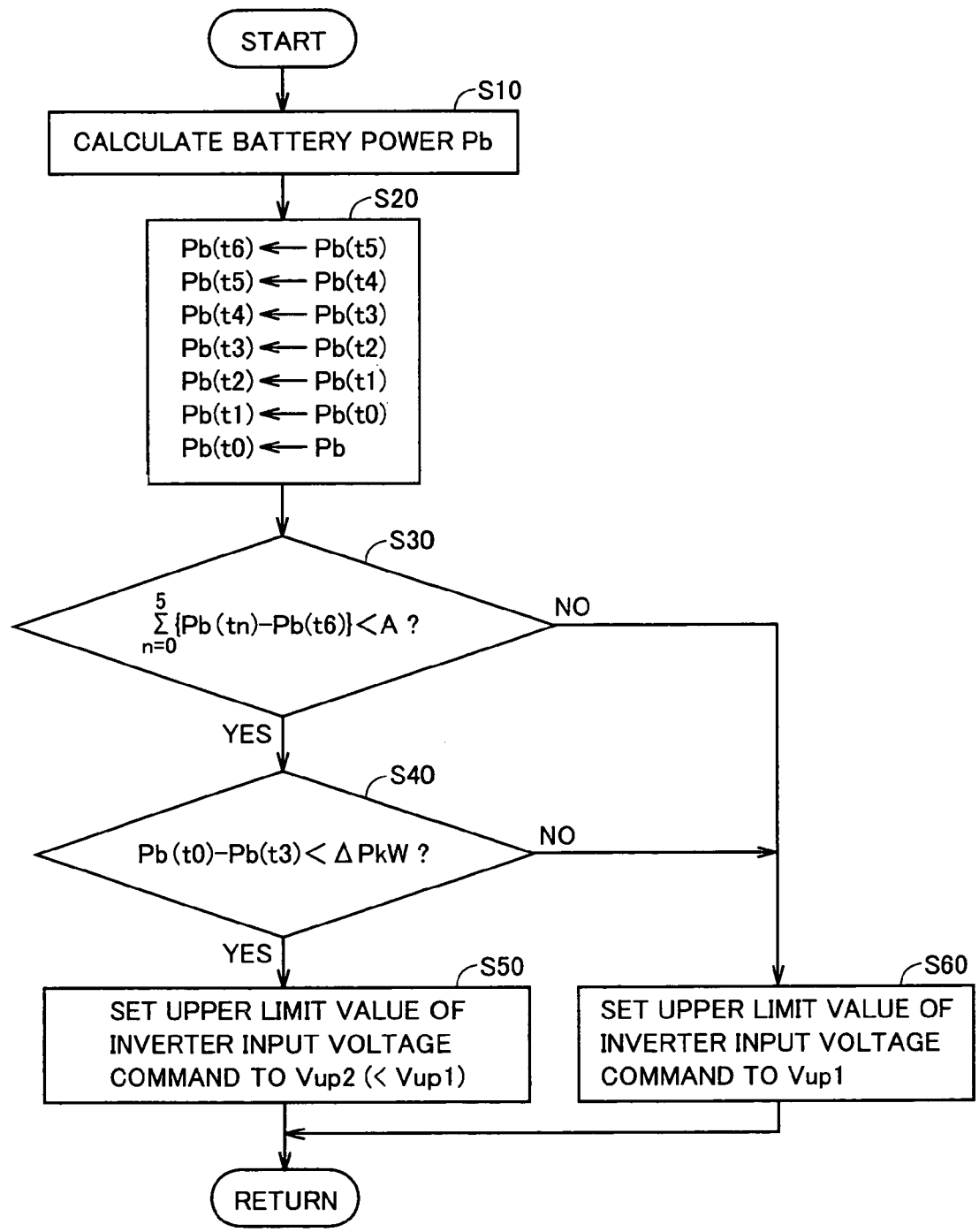
FIG. 3 is a flowchart of control of an upper limit value setting unit shown in FIG. 2.

FIG. 3 is a flowchart of control of upper limit value setting unit 52 shown in FIG. 2. The process in this flowchart is executed in a constant cycle that is set in advance. Referring to FIG. 3, upper limit value setting unit 52 calculates battery power Pb (step S10). Specifically, upper limit value setting unit 52 obtains battery power Pb by calculating the product of current Ib and voltage Vb. Battery power Pb can also be obtained using the power of AC motor M1 obtained by calculating the product of the motor current and motor voltage of AC motor M1.

Then, upper limit value setting unit 52 shifts the value of Pb (t5) storing the battery power calculated 6 cycles ago to Pb (t6), and then shifts the value of Pb (t4) storing the battery power calculated 5 cycles ago to Pb (t5). Then, upper limit value setting unit 52 shifts the value of Pb (t3) storing the battery power calculated 4 cycles ago to Pb (t4), and shifts the value of Pb (t2) storing the battery power calculated 3 cycles ago to Pb (t3). Further, upper limit value setting unit 52 shifts the value of Pb (t1) storing the battery power calculated 2 cycles ago to Pb (t2), and then shifts the value of Pb (t0) storing the battery power calculated 1 cycle ago to Pb (t1).

Then, upper limit value setting unit 52 inserts the currently-calculated battery power Pb of step S10 into Pb (t0) (step S20).

The value of the battery power n cycles ago stored in Pb (tn) is represented as battery power Pb (tn) hereinafter.

Upper limit value setting unit 52 calculates the difference of each battery power Pb (tn) (n is an integer of 0-5) from battery power Pb (t6) of 6 cycles ago, and conducts integration of each calculated value. In other words, upper limit value setting unit 52 conducts integration of the change in battery power Pb at times t5-t0 with battery power Pb (t6) of 6 cycles ago as the reference. Then, upper limit value setting unit 52 determines whether the integrated value of the change in battery power Pb is lower than a preset threshold value A (threshold value A is negative) (step S30).

When upper limit value setting unit 52 determines that the integrated value of the change in battery power Pb is equal to or higher than threshold value A (NO at step S30), control proceeds to step S60 where Vup1 is set at inverter input voltage command calculation unit 50 as the upper limit value of voltage command Vdc_com calculated by inverter input voltage command calculation unit 50 (step S60).

When determination is made that the integrated value of the change in battery power Pb is lower than threshold value A at step S30 (YES at step S30), upper limit value setting unit 52 calculates the difference between the currently calculated battery power Pb (t0) and the battery power Pb (t3) of 3 cycles ago, and determines whether the calculated battery power difference is lower than a preset threshold value ΔP kW (threshold value ΔP is a negative value) (step S40).

When upper limit value setting unit 52 determines that the battery power difference is lower than threshold value ΔP kW (YES at step S40), Vup2 lower than Vup1 is set at inverter input voltage command calculation unit 50 as the upper limit value of voltage command Vdc_com calculated by inverter input voltage command calculation unit 50 (step S50). When determination is made that the battery power difference is equal to or higher than threshold value ΔP kW at step S40 (NO at step S40), control proceeds to step S60 where upper limit value setting unit 52 sets Vup1 at inverter input voltage command calculation unit 50 as the upper limit value of voltage command Vdc_com.

Figure 4:
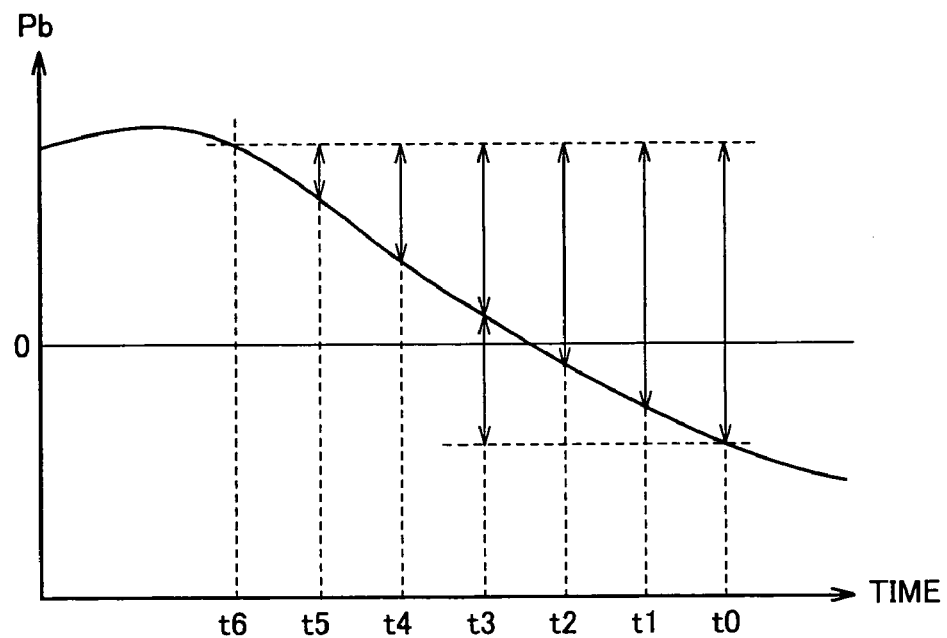
FIG. 4 is a diagram to describe the process executed by the upper limit value setting unit shown in FIG. 2.

FIG. 4 is a diagram to describe the process executed by upper limit value setting unit 52 shown in FIG. 2. In FIG. 4, time is plotted along the horizontal axis, whereas battery power Pb is plotted along the vertical axis. Time t0 corresponds to the current time. Time tm (m is an integer of 1-6) indicates the time corresponding to the starting point in time of the m cycles previous to time t0, i.e. the time of m cycles ago. A positive battery power Pb indicates that power is output from DC power source B (discharge). A negative battery power Pb indicates that power is input to DC power source B (charge).

A negative inclination of the curve corresponding to the change in battery power Pb indicates that the power balance of AC motor M1 is at the regeneration side. The reason why battery power Pb changes in the negative direction (reduction in the output power from DC power source B or increase in the input power to DC power source B) is due to the fact that voltage Vm tends to increase since the power balance of AC motor M1 is at the regeneration side, whereby the power supplied from DC power source B to capacitor C2 via boost converter 12 is reduced, or the power supplied from capacitor C2 to DC power source B via boost converter 12 is increased.

In order to detect that the power balance of AC motor M1 is continuously at the regeneration side, i.e. in order to detect that the inclination of the curve corresponding to the change in battery power Pb is continuously negative, upper limit value setting unit 52 conducts integration of the change in battery power Pb for a predetermined period (in the present embodiment, from time t6 corresponding to 6 cycles ago up to the current time t0), and determination is made whether the power balance of AC motor M1 is continuously at the regeneration side based on the integrated value.

The reason why the integrated value of the change in battery power Pb is employed is that there may be a case where determination of the power balance of AC motor M1 being continuously at the regeneration side cannot be made with the change in battery power Pb between certain times (battery power difference). Such a case will be described hereinafter.

Figure 5:
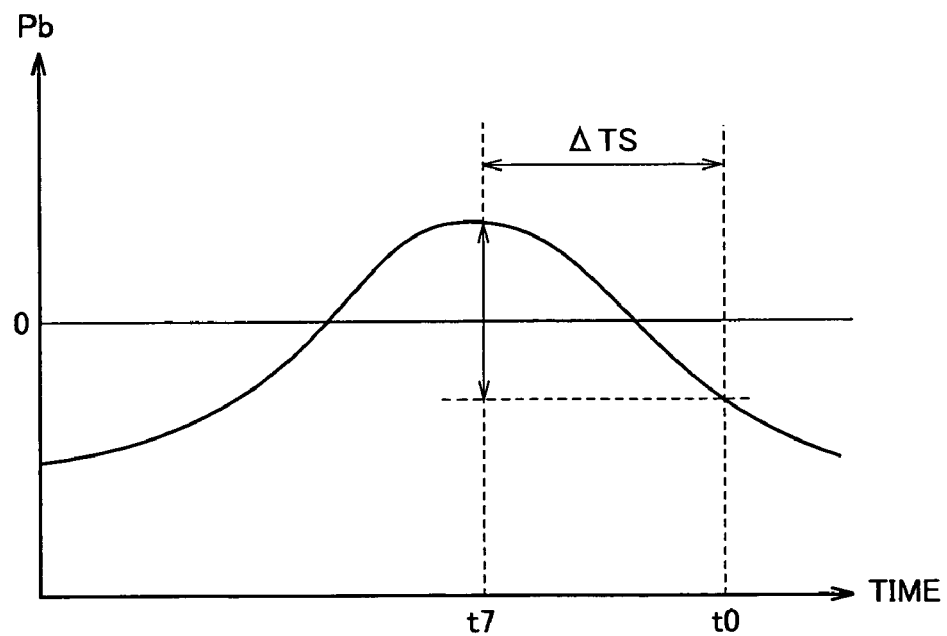
FIG. 5 represents an example of a change in battery power.

FIG. 5 represents an example of a change in battery power Pb. Referring to FIG. 5, consider the case where determination is made whether the power balance of AC motor M1 is at the regeneration side or not based on just the difference between battery power Pb (t0) at the current time t0 and battery power Pb (t7) at time t7 corresponding to time $\Delta$TS ago from the current time t0. The power balance of AC motor M1 is at the power running side (power consumption) prior to time t7. Voltage Vm will not immediately become excessive even if the power balance attains the regeneration mode after time t7. However, if the amount of change between battery power Pb (t7) and battery power Pb (t0) exceeds a threshold value, the upper limit value of voltage command Vdc_com that is the control target of voltage Vm will be reduced from Vup1 to Vup2 in this case.

This means that the upper limit value of voltage command Vdc_com will be reduced unnecessarily even in the state where the power balance of AC motor M1 is not continuously at the regeneration side and excessive voltage does not occur. This may lead to the possibility of output voltage Vm from boost converter 12 being reduced unnecessarily. Output voltage Vm of boost converter 12 is to be determined according to the required power of AC motor M1 based on torque control value TR of AC motor M1 and motor rotational speed MRN. It is not preferable to reduce voltage Vm unnecessarily.

Figure 6:
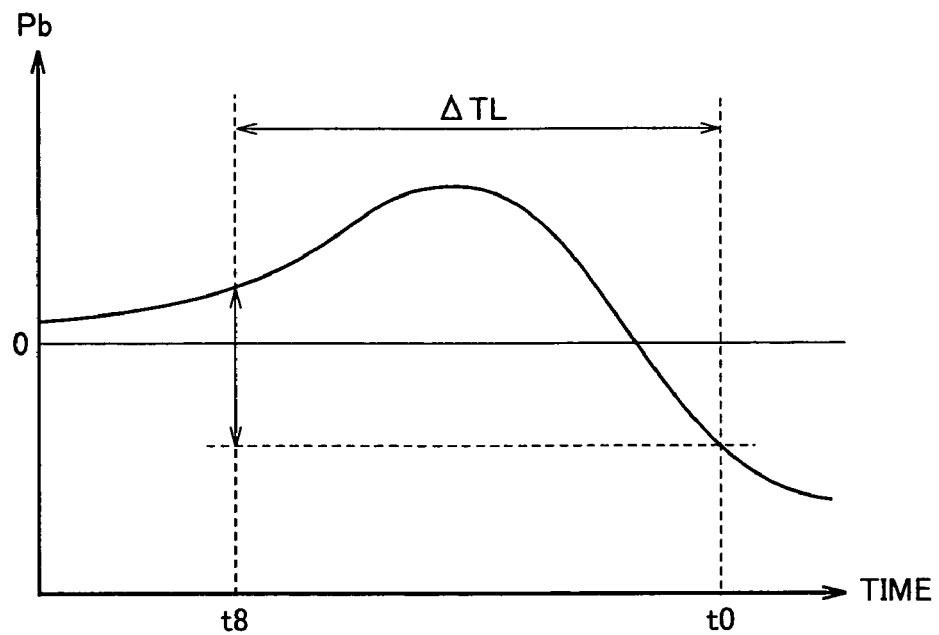
FIG. 6 represents an example of another change in battery power.

FIG. 6 represents an example of another change in battery power Pb. Referring to FIG. 6, a possible consideration is to increase time $\Delta$TS shown in FIG. 5 to a longer time $\Delta$TL in order to determine whether the power balance of AC motor M1 is continuously at the regeneration side. It is to be noted that battery power Pb may change during the period of time t8 to time t0, as shown in FIG. 6. Therefore, there is a possibility that the upper limit value of voltage command Vdc_com will be reduced unnecessarily even in the state where the power balance of AC motor M1 is not continuously at the regeneration side and excessive voltage does not occur, likewise the case of FIG. 5. As a result, voltage Vm may be reduced unnecessarily.

In view of the possibility that determination of whether the power balance of AC motor M1 is continuously at the regeneration side cannot be made properly by just the battery power difference from a certain point in time, the present embodiment is directed to using the integrated value of the change in battery power Pb to allow proper determination.

Referring to FIG. 4 again, upper limit value setting unit 52 reduces the upper limit value of voltage command Vdc_com from Vup1 to Vup2 when the integrated value of the change in battery power Pb is lower than threshold value A (A is a negative value) and the difference between battery power Pb (t0) at the current time t0 and battery power Pb (t3) of 3 cycles ago is lower than threshold value $\Delta$P kW ($\Delta$P is a negative value). In other words, upper limit value setting unit 52 does not reduce the upper limit value of voltage command Vdc_corn from Vup1 to Vup2 when the difference between battery power Pb (t0) and battery power Pb (t3) is equal to or higher than threshold value $\Delta$P kW. The reason why determination based on a battery power difference is made in addition to determination by the integrated value of change in battery power Pb is set forth below.

Figure 7:
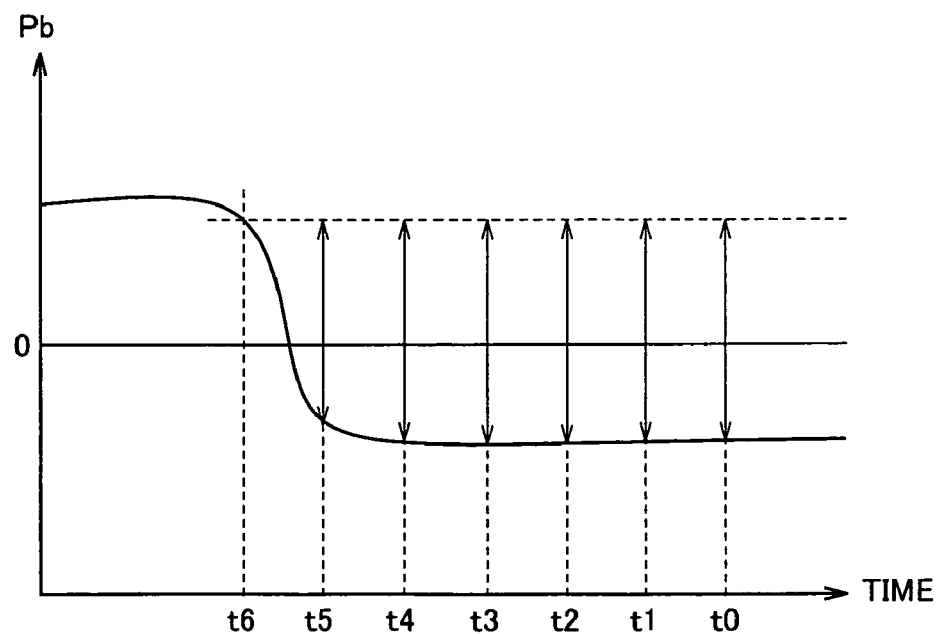
FIG. 7 represents an example of a further change in battery power.

FIG. 7 represents an example of another change in battery power Pb. Referring to FIG. 7, consider the case where battery power Pb is reduced drastically in the vicinity of time t6-t5, and then becomes stable thereafter. In this case, the integrated value of the change in battery power Pb with battery power Pb (t6) at time t6 as the reference will take a considerable value, lower than threshold A.

However, it cannot be said that the power balance of AC motor M1 is continuously at the regeneration side in such a case, and voltage Vm will not be excessive continuously. In order to eliminate such a case, the difference between battery power Pb (t0) at the current time t0 and battery power Pb (t3) at time t3 that is more recent than time t6 corresponding to the reference for calculating the integrated of the change in battery power Pb is taken into account.

Specifically, determination is made that the power balance of AC motor M1 is not continuously at the regeneration side when the battery power difference from time t3 is small even if the integrated value of the change in battery power Pb is lower than threshold value A. Therefore, the upper limit value of voltage command Vdc_com is set to the general level of Vup1.

According to the present embodiment set forth above, proper determination is made since determination of whether the power balance of AC motor M1 is continuously at the regeneration side is made using the integrated value of the change in battery power Pb for a predetermined period (time t6-t0). When the calculated integrated value is lower than threshold value A, the upper limit value of voltage command Vdc_com corresponding to the target voltage of boost converter 12 is reduced from Vup1 to Vup2. Therefore, boost converter 12 controls voltage Vm so as to suppress output voltage Vm. Thus, excessive inverter voltage can be prevented in the case where the power balance of AC motor M1 is continuously at the regeneration side.

Further, determination is made that the power balance of AC motor M1 is not continuously at the regeneration side when the difference in battery power from a predetermined time (time t3) is small. Therefore, the accuracy of the determination method using the integrated value of the change in battery power Pb is ensured.

Figure 8:
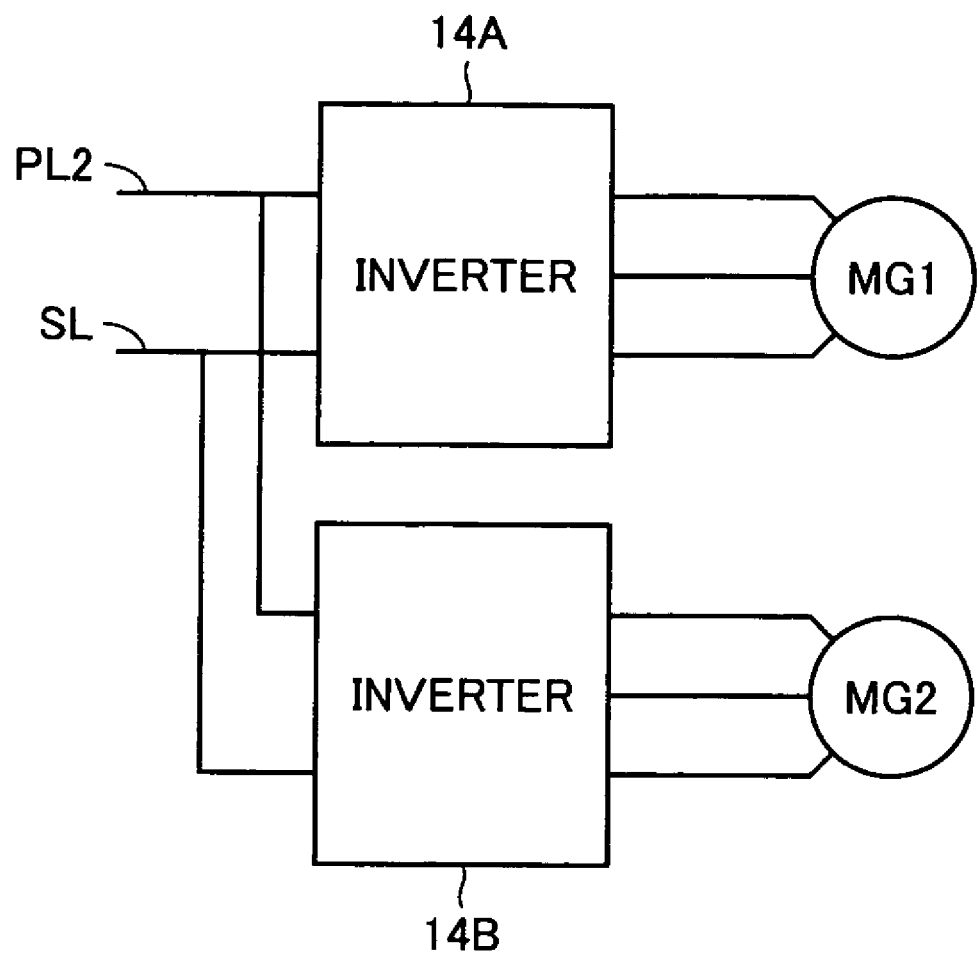
FIG. 8 is a diagram to describe application to a hybrid vehicle.

Motor driving apparatus 100 is incorporated into, for example, a hybrid vehicle. FIG. 8 is a diagram to describe application to a hybrid vehicle. In this case, AC motor M1 shown in FIG. 1 is formed of two motor generators MG1 and MG2, and inverter 14 is formed of two inverters. Specifically, two inverters 14A and 14B are provided corresponding to the two motor generators MG1 and MG2, respectively, as shown in FIG. 8. Inverters 14A and 14B are connected in parallel to power supply line PL2 and ground line SL that are connected to respective ends of capacitor C2.

Motor generator MG1 is coupled to the engine via a power split mechanism (not shown). Motor generator MG2 is coupled to a driving wheel via the power split mechanism.

Inverter 14A converts the DC voltage from boost converter 12 into AC voltage to drive motor generator MG1, and also converts the AC voltage generated by motor generator MG1 using the engine power into DC voltage for supply to boost converter 12. Inverter 14B converts the DC voltage from boost converter 12 into AC voltage to drive motor generator MG2, and also converts the AC voltage generated by motor generator MG2 by the rotating force of the driving wheel for supply to boost converter 12.

The power balance of motor generators MG1 and MG2 attains the regeneration side when the power generated by motor generator MG1 is greater than the power consumed by motor generator MG2. When the integrated value of the change in battery power Pb becomes lower than threshold value A and the change in battery power Pb becomes lower than threshold value ΔP kW, upper limit value setting unit 52 of control device 30 reduces the upper limit value of voltage command Vdc_com corresponding to the target voltage of boost converter 12 from Vup1 to a lower Vup2 based on the determination that the power balance of motor generators MG1 and MG2 is continuously at the regeneration side. Thus, output voltage Vm of boost converter 12 can be prevented from attaining an excessive level.

With regards to the calculation of battery power Pb, battery power Pb can be obtained by calculating the product of current Ib and voltage Vb. Battery power Pb can also be obtained using the power of motor generators MG1 and MG2 that can be calculated based on the motor current and motor voltage of each of motor generators MG1 and MG2.

Although the above embodiment has been described in which the change in battery power Pb is accumulated from 6 cycles ago for the integrated value, the period to conduct integration of the change in battery power Pb is not limited to this period, and may be longer or shorter. Further, although step S40 in FIG. 3 is based on using the change in battery power Pb from 3 cycles ago, this period is not limited to 3 cycles ago.

In the foregoing, AC motor M1 corresponds to "at least one electric motor" in the present invention. Inverter 14 corresponds to "driving device" in the present invention. Further, boost converter 12 and control device 30 correspond to "voltage converter" and "control device", respectively, in the present invention. Voltage sensor 10, current sensor 11, and control device 30 constitute "sensor device" of the present invention.

Furthermore, steps S10, S30, and S50 correspond to "first step", "second step", and "third step", respectively, in the present invention. The process executed by inverter input voltage command calculation unit 50, feedback voltage command calculation unit 54, and duty ratio conversion unit 56 corresponds to the process by "fourth step" in the present invention. Step S60 corresponds to "fifth step" in the present invention.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A voltage conversion apparatus comprising:
   a voltage converter provided between a DC power source and a driving device driving at least one electric motor in one of a power running mode and regeneration mode,
   a control device configured to boost voltage from said DC power source within a range not exceeding an upper limit value by controlling said voltage converter,
   a sensor device sensing power input to and output from said DC power source, and
   said control device reducing said upper limit value in an event of an integrated value of change in said power for a first predetermined period becoming lower than a first threshold value that is negative in a case where a sign of said power, when output from said DC power source, is positive.

2. The voltage conversion apparatus according to claim 1, wherein said control device reduces said upper limit value in an event of the integrated value of change in said power from a reference value for said first predetermined period becoming lower than said first threshold value, said reference value corresponding to said power at a starting point in time of said first predetermined period.

3. The voltage conversion apparatus according to claim 1, wherein said control device ceases reducing said upper limit value when change of said power from a starting point in time of a second predetermined period shorter than said first predetermined period is at least a second threshold value that is negative.

4. The voltage conversion apparatus according to claim 1, wherein said first predetermined period is a defined period allowing determination of whether a power balance of said at least one electric motor is continuously at a regeneration side.

5. A power output apparatus comprising:
   at least one electric motor,
   a driving device driving said at least one electric motor in one of a power running mode and regeneration mode,
   a rechargeable DC power source,
   a voltage converter converting voltage between said DC power source and said driving device,
   a control device configured to boost voltage from said DC power source within a range not exceeding an upper limit value by controlling said voltage converter,
   a sensor device sensing power input to and output from said DC power source, and
   said control device reducing said upper limit value in an event of an integrated value of change in said power for a first predetermined period becoming lower than a first threshold value that is negative in a case where a sign of said power, when output from said DC power source, is positive.

6. The power output apparatus according to claim 5, wherein said control device reduces said upper limit value in an event of the integrated value of change in said power from a reference value for said first predetermined period becoming lower than said first threshold value, said reference value corresponding to said power at a starting point in time of said first predetermined period.

7. The power output apparatus according to claim 5, wherein said control device ceases reducing said upper limit value when change of said power from a starting point in time of a second predetermined period shorter than said first predetermined period is at least a second threshold value that is negative.

8. The power output apparatus according to claim 5, wherein said first predetermined period is a defined period allowing determination of whether a power balance of said at least one electric motor is continuously at a regeneration side.

9. The power output apparatus according to claim 5, wherein said at least one electric motor includes first and second AC motors,
   said driving device including
   a first inverter driving said first AC motor in one of a power running mode and regeneration mode,
   a second inverter driving said second AC motor in one of a power running mode and regeneration mode,
   said power output apparatus further comprising:
   an internal combustion engine mechanically coupled to a rotational shaft of said first AC motor, and a driving wheel mechanically coupled to a rotational shaft of said second AC motor.

10. A control method of a voltage converter provided between a DC power source and a driving device that drives at least one electric motor in one of a power running mode and regeneration mode, said control method comprising:

a first step of sensing power input to and output from said DC power source, a second step of calculating an integrated value of change in said power for a first predetermined period, a third step of reducing an upper limit value of voltage output from said voltage converter to said driving device in an event of said calculated integrated value becoming lower than a first threshold value that is negative in a case where a sign of said power, when output from said DC power source, is positive, and a fourth step of boosting voltage from said DC power source within a range not exceeding said upper limit value by controlling said voltage converter.

11. The control method of a voltage converter according to claim 10, wherein, in said second step, the integrated value of change in said power from a reference value for said first predetermined period is calculated, said reference value corresponding to said power at a starting point in time of said first predetermined period.

12. The control method of a voltage converter according to claim 10, further comprising a fifth step of ceasing reducing said upper limit value when change in said power from a starting point in time of a second predetermined period shorter than said first predetermined period is at least a second threshold value that is negative.

13. The control method of a voltage converter according to claim 10, wherein said first predetermined period is a defined period allowing determination of whether a power balance of said at least one electric motor is continuously at a regeneration side.

14. The control method of a voltage converter according to claim 10, wherein said at least one electric motor includes first and second AC motors, said driving device including a first inverter driving said first AC motor in one of a power running mode and regeneration mode, and a second inverter driving said second AC motor in one of a power running mode and regeneration mode, said first AC motor having a rotational shaft mechanically coupled to an internal combustion engine, and said second AC motor having a rotational shaft mechanically coupled to a driving wheel.

* * * * *